United States Patent [19]
Richter et al.

[11] Patent Number: 5,995,491
[45] Date of Patent: *Nov. 30, 1999

[54] METHOD AND APPARATUS FOR MULTIPLE MEDIA DIGITAL COMMUNICATION SYSTEM

[75] Inventors: Andreas Richter; Ogden Cartwright Reed, Jr., both of Philadelphia, Pa.

[73] Assignees: Intelligence at Large, Inc., Phildelphia, Pa.; Micron Technology, Inc., Boise, Id.

[*] Notice: This patent is subject to a terminal disclaimer.

[21] Appl. No.: 08/795,798

[22] Filed: Feb. 5, 1997

Related U.S. Application Data

[63] Continuation of application No. 08/626,580, Apr. 2, 1996, Pat. No. 5,623,490, which is a continuation of application No. 08/073,956, Jun. 9, 1993, abandoned.

[51] Int. Cl.$^6$ .................................................. H04L 12/56
[52] U.S. Cl. ......................... 370/263; 340/412; 345/330
[58] Field of Search ..................................... 370/260–271, 370/389, 412, 462; 395/200.34–200.37; 345/330

[56] References Cited

U.S. PATENT DOCUMENTS

| | | | |
|---|---|---|---|
| 4,516,156 | 5/1985 | Fabris et al. ............................. | 358/85 |
| 4,707,831 | 11/1987 | Weir et al. ................................ | 370/94 |
| 4,763,317 | 8/1988 | Lehman et al. .......................... | 370/581 |
| 4,847,829 | 7/1989 | Tompkins et al. ........................ | 370/62 |
| 4,935,953 | 6/1990 | Appel et al. .............................. | 379/53 |
| 4,942,470 | 7/1990 | Nishitani et al. ........................ | 358/160 |
| 4,942,569 | 7/1990 | Maeno ...................................... | 370/60 |
| 4,945,410 | 7/1990 | Walling .................................... | 358/141 |
| 4,949,169 | 8/1990 | Lumelski et al. ......................... | 358/86 |
| 4,991,169 | 2/1991 | Davis et al. .............................. | 370/77 |
| 4,995,071 | 2/1991 | Weber et al. ............................. | 379/53 |
| 5,014,267 | 5/1991 | Tompkins et al. ........................ | 370/62 |
| 5,155,594 | 10/1992 | Birnstein et al. ........................ | 358/136 |
| 5,177,604 | 1/1993 | Martinez .................................. | 358/86 |
| 5,210,836 | 5/1993 | Childers et al. ......................... | 395/375 |
| 5,231,492 | 7/1993 | Dangi et al. ............................. | 358/143 |
| 5,309,433 | 5/1994 | Cidon et al. ............................. | 370/60 |
| 5,537,548 | 7/1996 | Fin et al. ............................. | 395/200.04 |
| 5,594,859 | 1/1997 | Palmer et al. .......................... | 395/330 |

*Primary Examiner*—Melvin Marcelo
*Attorney, Agent, or Firm*—Dickerstein Shapiro Morin & Oshinsky LLP

[57] ABSTRACT

The present invention is embodied in a digital communication system where multiple media data sources are time multiplexed into a packetized data stream, each packet having an assigned priority and the packetized data stream transmitted in substantially the order of assigned priority. At both the transmit side, and the receive side, audio packets are given priority processing over video packets, which in turn have priority over text/graphics data packets. Continuous real time audio playback is maintained at the receiver by delaying the playback of received audio in a first in/first out (FIFO) buffer providing a delay at least equal to the predicted average packet delay for the communication system. Optionally, the average system delay is continuously monitored, and the audio playback delay time is adjusted accordingly. Audio playback is slowed or accelerated in order to shrink or grow the difference in time between the sender and receiver. In another aspect of the invention, a conference of three or more callers is created by broadcasting a common packetized data stream to all conference callers.

44 Claims, 16 Drawing Sheets

CONNECTION STATUS

TRYING TO ESTABLISH A CONNECTION WITH:

PERSON AT ADDRESS: ANDY RICHTER

[CANCEL]

CONNECTION STATUS

THE CALL WAS NOT ACCEPTED BY:

PERSON AT ADDRESS: ANDY RICHTER

[OK]

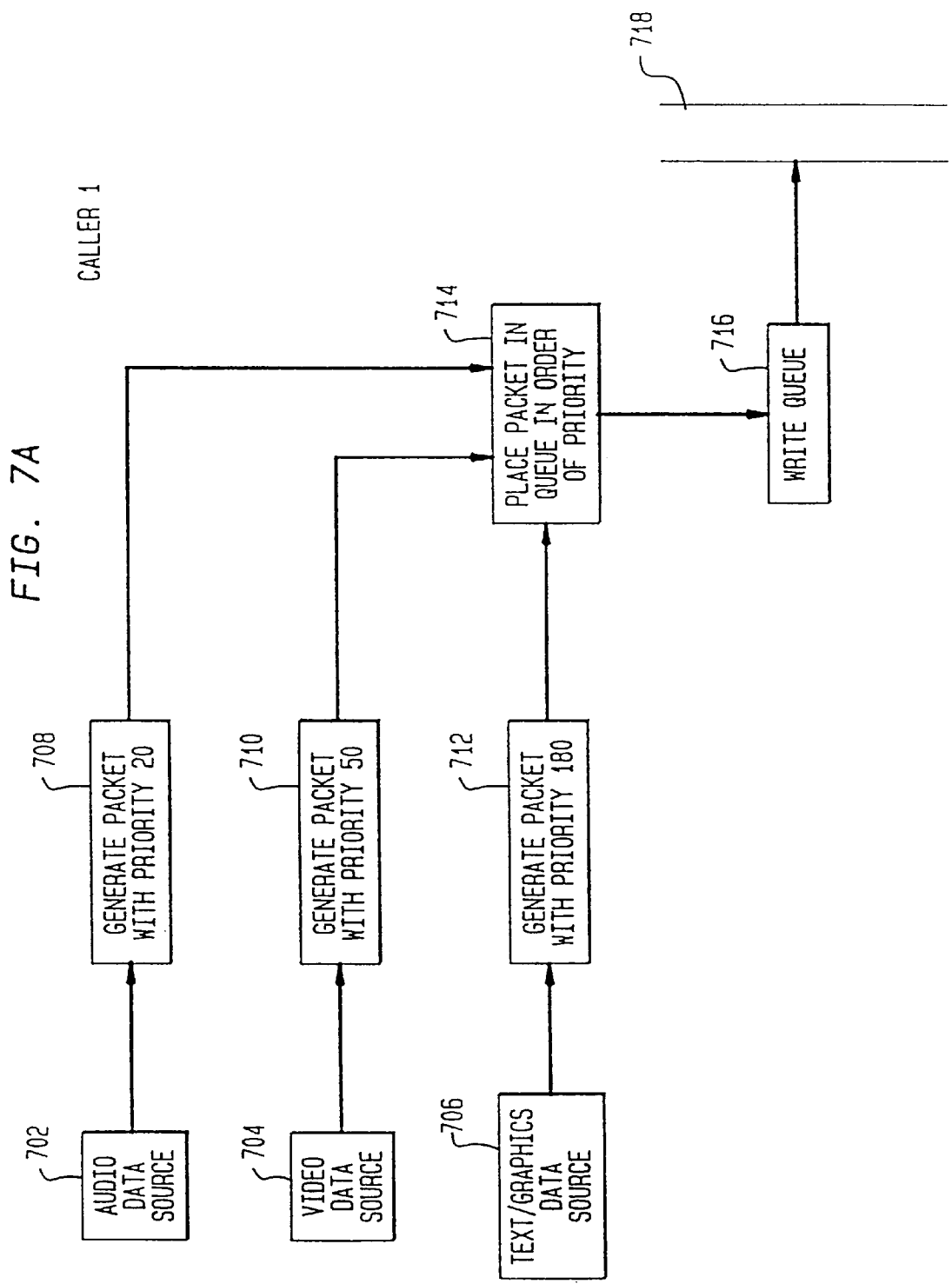

METHOD AND APPARATUS FOR MULTIPLE MEDIA DIGITAL COMMUNICATION SYSTEM

This application is a continuation of application Ser. No. 08/626,580, filed Apr. 2, 1996 now U.S. Pat. No. 5,623,490, which is a continuation application of Ser. No. 08/073,956, filed Jun. 9, 1993 (abandoned).

FIELD OF THE INVENTION

The present invention relates to the field of digital communications systems, and more particularly to systems transporting multiple media (multimedia) and/or communicating such multimedia through a plurality of connections to multiple callers.

BACKGROUND OF THE INVENTION

In the prior art, multimedia communications, such as videoconferencing systems for providing two way video and audio, are well known. Given sufficient bandwidth and dedicated independent channels, (e.g. 6 Mhz for an analog video channel, 3 Khz for an audio link over a standard analog telephone line, etc), videoconferencing between two callers can be realized. However, communication channels providing 6 Mhz video bandwidth are not generally or universally available. A major obstacle to wide spread implementation and acceptance of multiple media conferencing systems is the limited bandwidth of the available communication channels. In addition, typical communication channels available on packet switched networks such as AppleTalk, from Apple Computer, California, USA, or Netware from Novell Inc, Oregon, USA, do not provide the continuous real time analog or digital connection of a telephone line or modem. Instead, packet switched networks provide non-real time bursts of data in the form of a switched packet containing a burst of digital data. Thus, in addition to bandwidth limitations, packet switched networks present delay limitations in implementing real time multiple media conferencing systems. The same bandwidth and time delay limitations which apply to all time division multiple access (TDMA) communication systems and similar schemes present obstacles to achieving real time multimedia communications.

Typically, the problem of videoconferencing two callers is approached by compressing the composite video signal so that the resulting transmitted data rate is compatible with the available communication channel, while permitting acceptable video and audio to be received at the other end of the communication channel. However, solutions in the past using lossy compression techniques, have been limited to compromising quality in order to obtain acceptable speed. Recently, non-lossy compression techniques have become available. The problem still remains as to how to match the bandwidth and timing constraints of available digital formats to the available communication channels, both present and future.

SUMMARY OF THE INVENTION

The present invention is embodied in a digital communication system where multiple media data sources are time multiplexed into a packetized data stream. At both the transmit side, and the receive side, audio packets are given priority processing over video packets, which in turn have priority over text/graphics data packets. Continuous real time audio playback is maintained at the receiver by delaying the playback of received audio in a first in/first out (FIFO) buffer providing a delay at least equal to the predicted average packet delay for the communication system. Optionally, the average system delay is continuously monitored, and the audio and video playback delay time as well as audio and video qualities are adjusted accordingly. In another embodiment of the invention, a conference of three or more callers is created by broadcasting a common packetized data stream to all conference callers. Use of the present invention further permits an all software implementation of a multimedia system.

1. In accordance with a first aspect of the present invention, multiple data sources forming data packets are combined into a prioritized data stream.

The present invention is embodied in a method and apparatus for combining data from a plurality of media sources into a composite data stream capable of supporting simultaneous transmission including multiple video and graphic signals and real time audio. Video, audio and other signals are integrated in a non-standard transmission format determined by a novel streaming algorithm and prioritization scheme designed to provide the best balance between transmission quality and realization of real time rendition of each.

For example, each data type packet at the transmitter is assigned a priority between 0 and 10000, with 0 being the highest priority and 10000 the lowest. An audio packet is given priority 20, a video packet is given priority 50. Screen data packets and file data transfer packets are both given priority 180.

Before transmission on the communication channel, packets are placed in a queue according to priority order. As new packets are generated, the queue is reorganized so that the new packet is placed into its proper priority order.

At the receiver, each task runs according to its assigned priority. Packets with priorities between 0 and 100 are processed first, to the exclusion of packets with priorities 101 through 10000. Audio, being the highest priority (20), is processed first to the exclusion of all other packets. Within the class of packets with priorities between 101 and 10000, packets are processed according to relative priority. That is, higher priority tasks do not completely shut out tasks of lower priority. The relationship among priorities is that a priority 200 task runs half as often as a priority 100 task. Conversely, a priority 100 task runs twice as often as priority 200 task. Tasks with priorities between 0 and 100 always run until completion. Thus, video, screen data and file data, processing tasks are completed after audio processing in accordance with the relative priority of the packets.

A multi-tasking executive dynamically reassigns task priorities, to efficiently complete all tasks within the available time, while performing the highest priority tasks first. At any given time, there are different tasks all at different priorities, all yielding to each other. In general, a task yields to a higher priority task, if it is not running an uninterruptable sequence. If the current task completes its cycle, its priority is reassigned to a lower priority. If the priority of two or more tasks is equal, then the multi-tasking executive executes each task in a round robin fashion, performing a portion of each task, until the completion of all tasks with the same priority.

The assignment of packet priorities, and processing according to priority assures that audio will be given precedent over video, while audio and video will be given precedent over both screen data and file transfer data.

As indicated above, continuous real time audio playback is maintained at the receiver by delaying the playback of received audio in a first in/first out (FIFO) buffer having a size at least equal to the predicted average packet delay for the communication system. Optionally, the delay of the audio FIFO may be made variable. A variable delay audio FIFO buffer at the receiver allows the system to shrink or grow the time delay between one machine and the other. The ability to shrink or grow the difference in time between the sender and receiver permits the system of the present invention to compensate for indeterminate system delays. If the changes are slight, the difference in pitch is not noticeable. For greater changes, the technique of audio resampling may be used to increase or decrease the rate of audio playback without changing the pitch of audio content.

Similarly, video playback continuity at the receiver may also be improved by delaying the playback of received video in a first in/first out (FIFO) buffer having a size at least equal to the predicted average packet delay for the communication system. The delay of the video FIFO may be made variable, allowing the system to shrink or grow the time delay between one machine and the other to compensate for indeterminate system delays. Again, if the changes are slight, the change in frame rate is not noticeable. However, video data does not age as quickly as audio data. Therefore a smaller video FIFO can be used. Also, a video image may have short discontinuities without a perceived loss of the video connection. Audio playback, on the other hand, is more sensitive to discontinuities, and it is more important to maintain continuity at the receiver. Ideally, when both audio and video are used in a multimedia conference, the delay for audio and video should be equal to make sure that they are synchronized. In the latter case, the actual system delay is calculated by finding the maximum delay of both audio and video packets.

Data from media sources tend to come in bursts. For example, audio data rates rise when speaking, and fall to zero during a silence. In the present embodiment, the silence between words provides the present system with an opportunity to catch up by refilling the audio FIFO buffer before it empties. In such manner, the present system compensates for the delay inherent in a packet switched, time delay variant, communication channel.

Similarly, video sources including graphic screen data, are generated in bursts. That is, the data rate for video ideally falls to zero when there is no motion. The data rate for transmitting screen graphics falls to zero when are no changes. When the caller changes the screen, (such as the collaborative work document displayed on the screen), data is generated.

Thus, following the priority scheme of the present invention, video is updated only when no speech data is being processed. However, processing of speech data does not included the playing of sound. Once the sound starts playing, there is no need to further spend time to process the sound. Sound playing needs no supervision. Therefore, video updating occurs while sound is playing. After speech is playing close to real time (with a delay), video text and graphics are updated in the background. Video, text, graphics and data files are updated at lesser priorities. Except for audio and video data, task priorities are re-assigned to assure that all tasks will be completed, and that a higher priority task will not completely prevent the lower priority tasks from being completed.

2. In accordance with a second aspect of the present invention, multiple signal packets are broadcast to a plurality of callers to create a common multimedia conference.

In addition to assigned priorities, data packets having multiple destination addresses are broadcast over a plurality of connections to multiple callers. Each caller receives the same data packets with assigned priorities, and processes the received packets in a similar manner. As new data is generated from each caller in the video conference, new data packets are broadcast to the other callers. Thus, due to the broadcast of data packets representing audio, video and screen data, all callers are conferenced together, each seeing and hearing each other, while discussing the same screen document. Additional callers can be added to the conference over a plurality of connections without adding undue burden, because in a conference, each caller needs to generate data only once, which is then transimtted either simultaneously or sequentially depending on the kind of connection, to other callers.

3. In accordance with a third aspect of the present invention data received on a first communication medium (for example on a broadband local area network, such as ethernet) are re-broadcast on a different communication medium (such as a telephone line) in order to conference callers on the different communication media in a common multimedia conference. The present invention thereby provides the option of desktop videoconferencing on standard computer networks and telephone lines.

BRIEF DESCRIPTION OF THE DRAWINGS

FIG. 7A is a block diagram of a multiple media communication system transmitter in accordance with the present invention.

DETAILED DESCRIPTION

Figures 1A, 1B, 1C, 1D:
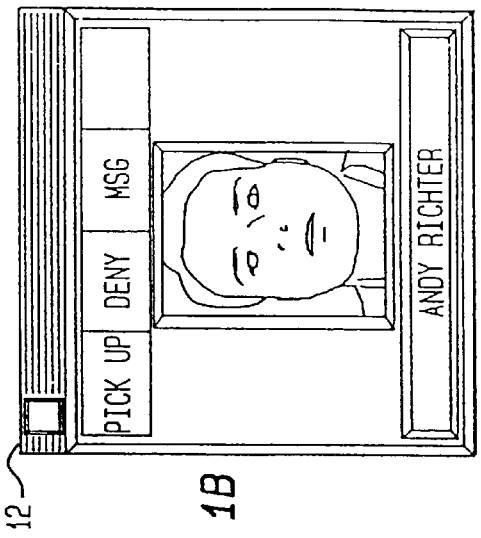
FIG. 1A is a dialog box indicating connection status as it would appear on the screen of a Macintosh computer used in conjunction with the present invention.
FIG. 1B is a dialog box indicating an incoming call as it would appear on the screen of a Macintosh computer used in conjunction with the present invention.
FIG. 1C is a dialog box illustrating the connection status message that would appear for a call that was not accepted as it would appear on the screen of a Macintosh computer used in conjunction with the present invention.
FIG. 1D is a window containing a moving video image as it would appear on the screen of a Macintosh computer used in conjunction with the present invention.

From the viewpoint of the caller, the present multimedia communication system operates as follows:

A caller on a desktop computer initiates a multimedia call by selecting a media type and desired connection with a second party. A dialog box of the type shown in FIG. 1A appears on the screen, illustrating the connection status. Caller 2, who receives the call, views a dialog box on his screen of the type illustrated in FIG. 1B to announce an arriving call. Caller 2 has the option of deciding to either pick up or deny the call, or to take a message. If the call is denied by caller 2, then caller 1 views a dialog box 14 as illustrated in FIG. 1C. For purposes of illustration, a video box 16 containing a video of the first caller 1 is shown in FIG. 1D. If the caller decides to take a message, caller 2 can now control the connection and optionally send an announcement message requesting a message.

Figure 2:
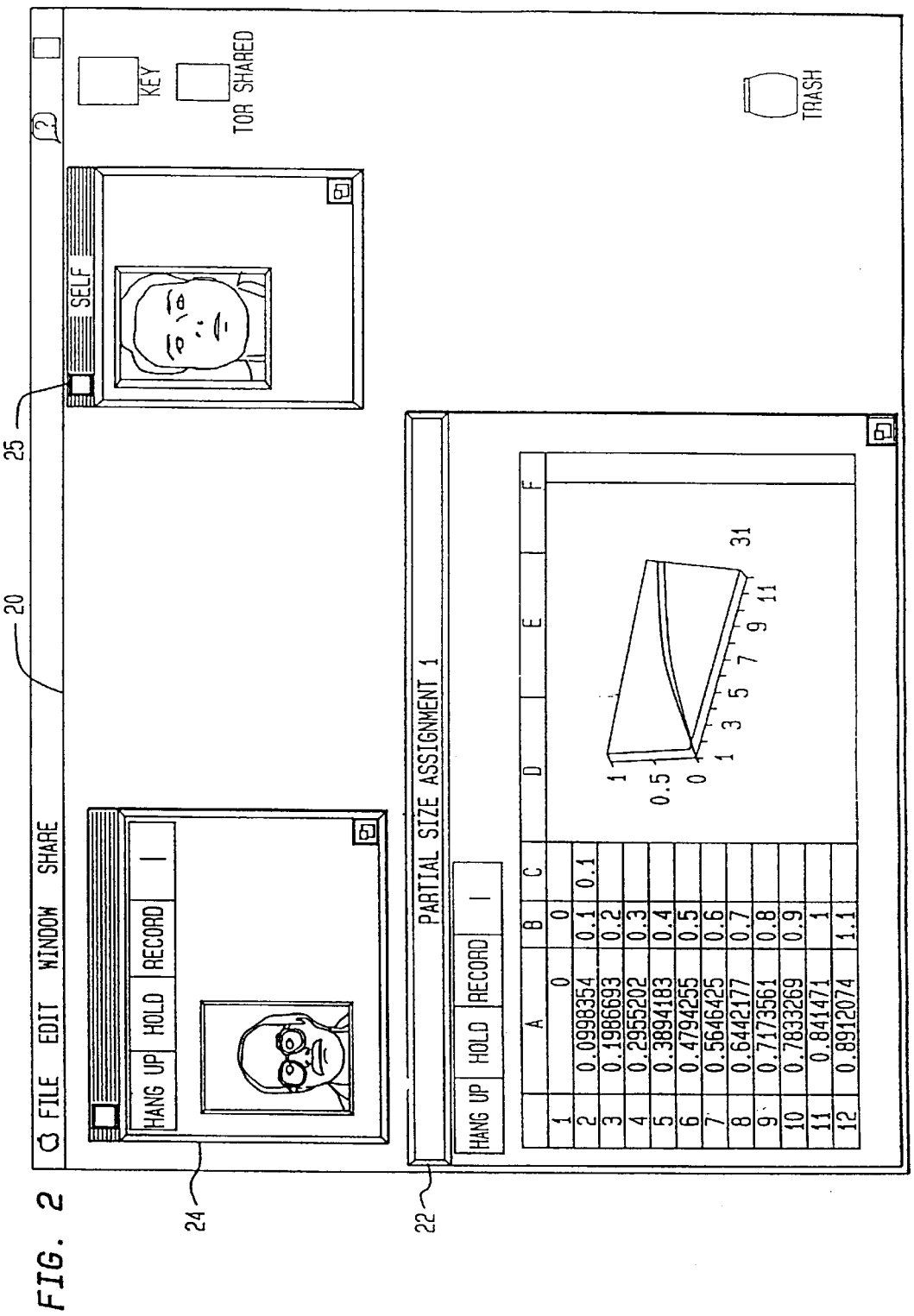
FIG. 2 is a video screen illustrating a video conference between two callers and sharing a common document.

FIG. 2 illustrates the screen appearance of a typical multimedia call with a collaborative document. On the screen 20 of caller 1, a video box 24 appears in which a moving video showing caller 2 appears. The screen of caller 2 is similar, but contains the image and sound of caller 1. On both the screens of callers 1 and 2 can be a collaborative document 22. Caller 1 and caller 2 are connected by moving video and two way audio and can discuss collaborative document. Caller 1 may manipulate the document and the changes will appear on the screen of caller 2. In an alternate embodiment, caller 2 may manipulate the document as well.

Figure 3:
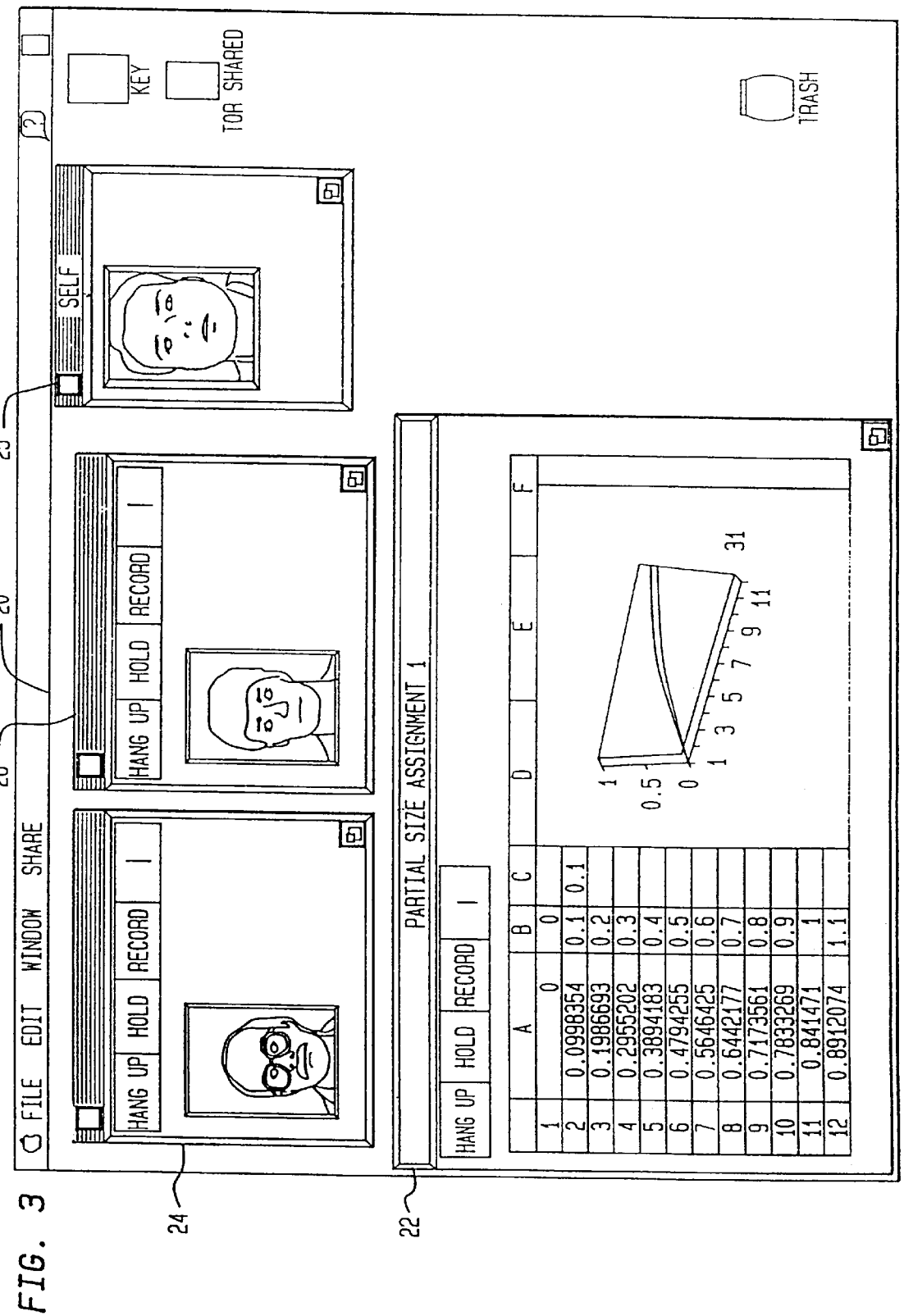
FIG. 3 is a video screen illustrating a video conference between three callers and sharing a common document.

FIG. 3 illustrates the screen 20 appearance of a three party video conference as it appears to caller 1. Caller 3 appears in a video box 26 as well as caller 2 in another video box 26, and the collaborative document 22. The other callers 2 and 3 see the other two members of their video conference on their screen as well as collaborative document 22. The size and position of video boxes 24 and 26 is selectable by caller 1. A video image 25 of caller 1 may also appear on the screen of caller 1 to let caller 1 see what is being transmitted. Reducing the size of video box 25 reduces the amount of (video) data which must be transmitted by the communication system.

Connection Establishment

Figure 4:
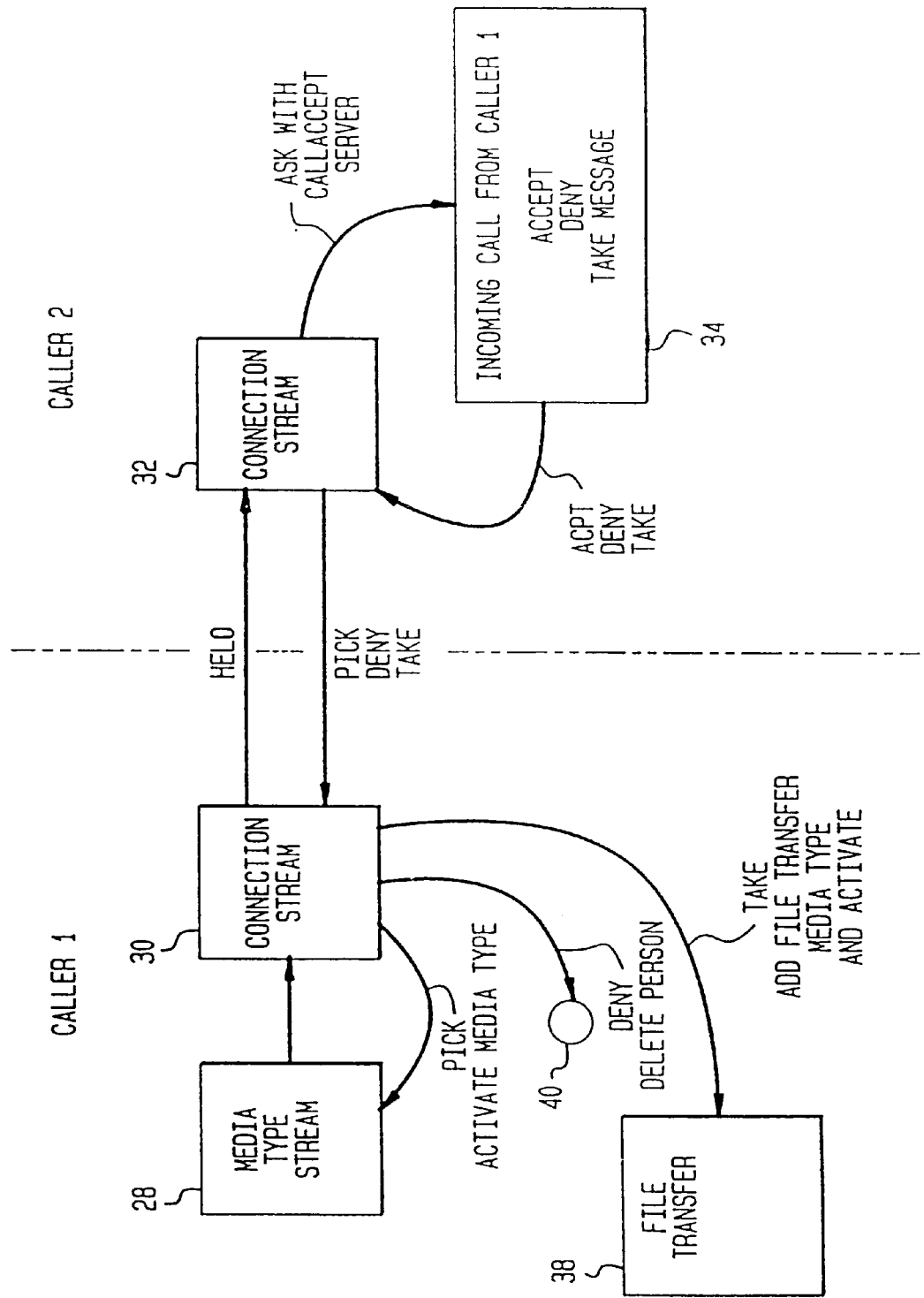
FIG. 4 is a block diagram illustrating the sequence of operations for establishing a connection in a multiple media digital communication system embodying the present invention.

The sequence of operation for establishing a connection between caller 1 and caller 2 over a communication network is illustrated in FIG. 4. The network may typically be AppleTalk, ethernet or any other commonly available local area network. Also, a connection can be established over a telephone line or other proprietay digital telephone lines such as ISDN.

The terms, "connection stream" and "media stream" used below are further defined in the description of FIGS. 8–11. For present purposes, such terms may be regarded as routines for handling data packets. Caller 1 selects a media type stream 28, and a connection stream 30, suitable for the communication medium. An initial message termed a helo packet is sent to a caller 2 connection stream 32. The connection stream 32 provides a dialog box to caller 2 informing that there is an incoming call from caller 1. Caller 2 can then decide 34 to either accept or deny the call, or alternatively to take a message if caller 2 is not present. The accept, deny and take commands are communicated back to the connection stream 32 which sends a return message across the communication system back to connection stream 30 and caller 1.

In addition to denying or taking the call, caller 2 has the option to pick a different media type. That is, for example, if the media type stream 28 of caller 1 is video, and caller 2 does not want to accept a video call but will accept an audio call, then the return message pick will indicate that caller 2 is picking audio as the media for an incoming call. At caller 1, connection stream 30 distributes the response from caller 2. Specifically, if the call is denied then the connection attempt is deleted 40. If a different media is picked, then a modification of the media type stream 28 is performed. If take a message was selected, then the appropriate file transfer 38 takes place to transmit an announcement file, and a message is requested to be sent back.

Figure 5:
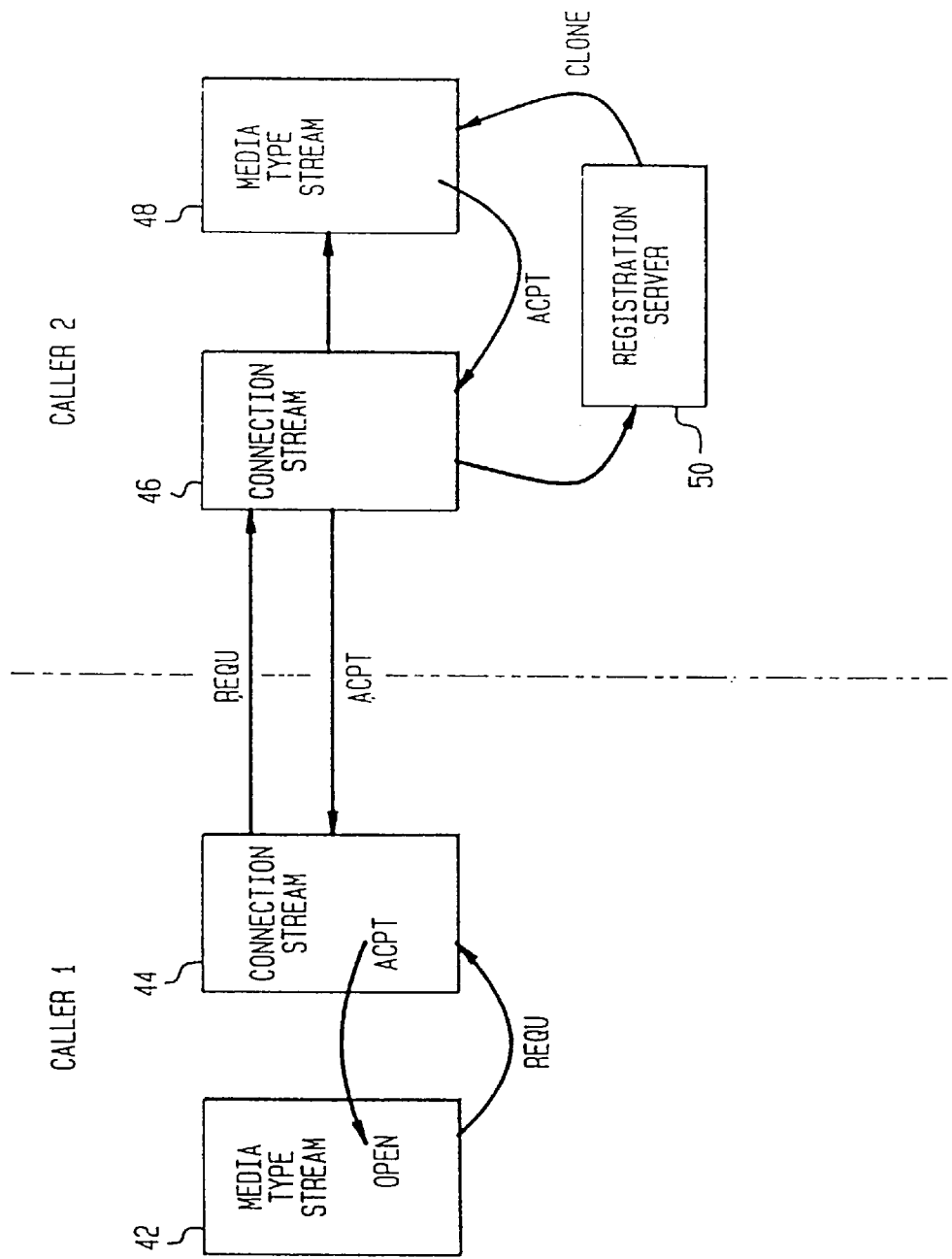
FIG. 5 is a block diagram illustrating the sequence of operations for establishing media types to be used in a conference call in a multiple media digital communication system embodying the present invention.

FIG. 5 illustrates the communication sequence for selecting the among the various media types between caller 1 and caller 2. For media type stream 42, a request is sent through connection stream 44 across the communication channel to caller 2 at connection stream 46 which is forwarded to media type stream 48. Caller 2 configures itself to accept the media type stream which is being presented to it by modification of its registration server 50 which clones the desired media type. If accepted, media type stream 48 sends a message through connection stream 46 across the communication medium to caller 1. The acceptance is received at connection stream 44 and communicated to media type stream 42 which opens up the connection for the given media type between caller 1 and caller 2.

Data Format in Packets with Priority and Multiple Destinations

Figure 6:
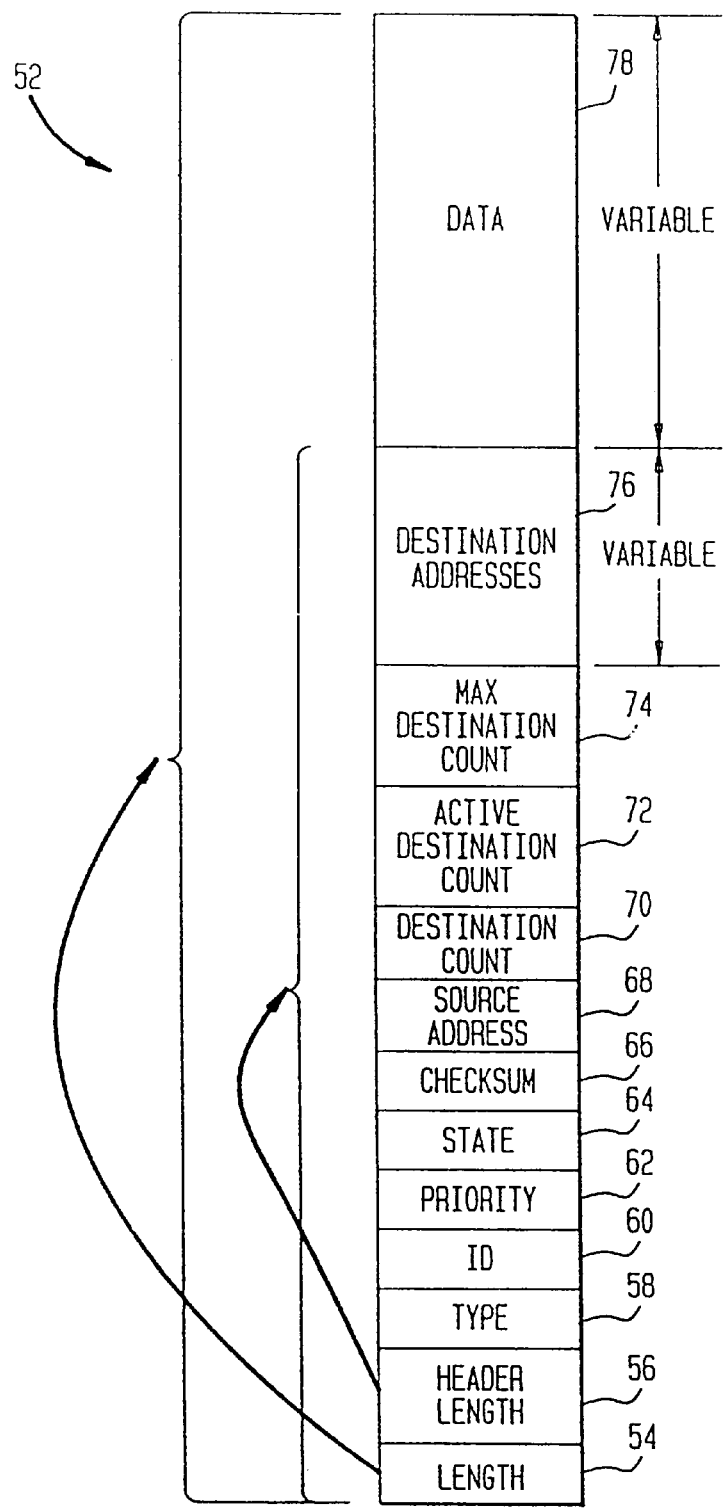
FIG. 6 is an illustration of a packet data format used in conjunction with the present invention.

FIG. 6 shows a packet data format 52 suitable for use in conjunction with the present invention. The length of the packet is indicated by data field 54. The length of the header is indicated by data field 56. The packet type and identification are respectively indicated by data fields 58 and 60.

The priority of the data packet is indicated in data field 62. When transporting multiple media digital data packets, the priority data field determines which of the packets has the highest priority in processing. Data fields 64 and 66 respectively contain information as to the message state, and a checksum for determining message errors. The packet source address is indicated at data field 68, and a destination count as to the number of destinations this packet will reach is indicated at data field 70. Also, an active destination count, the number of destination which have not yet received this packet, and a maximum destination count is provided in data fields 72 and 74 respectively.

The data packet 52 of FIG. 6 contains a number of destination addresses 76. The plural destination addresses provides a broadcast capability by which all the callers in a conference call can view common documents and see and hear each other. That is, when a data packet 52 contains audio data representing one speaker's voice, that packet is broadcast to all the destinations simultaneously. The same is true of the video and document updates. The destination addresses is followed by the actual variable length data of the data packet in field 78.

System Overview

A block diagram of a multiple media communication system transmitter is shown in FIG. 7A. A packet with priority 20 is generated 708 from audio data source 702. A packet with priority 50 is generated 710 from video data source 704. A packet with priority 180 is generated 712 from text/graphics data source 706. A WriteQueue 716 (a buffer memory for storing packets to be sent) is provided for holding packets to be transmitted over the communication channel 718. Control 714, responsive to packet generation, 708, 710, 712 places the packets in the WriteQueue 716 in order of packet priority. In hardware, a queue maybe a FIFO. In software, WriteQueue 716 is a linked list of packet containers with pointers to the next and previous packet containers. Since the Writequeue 716 is an ordered list, adding a new entry is achieved by modifying two pointers to add the new entry to the list in the proper order.

Figure 7B:
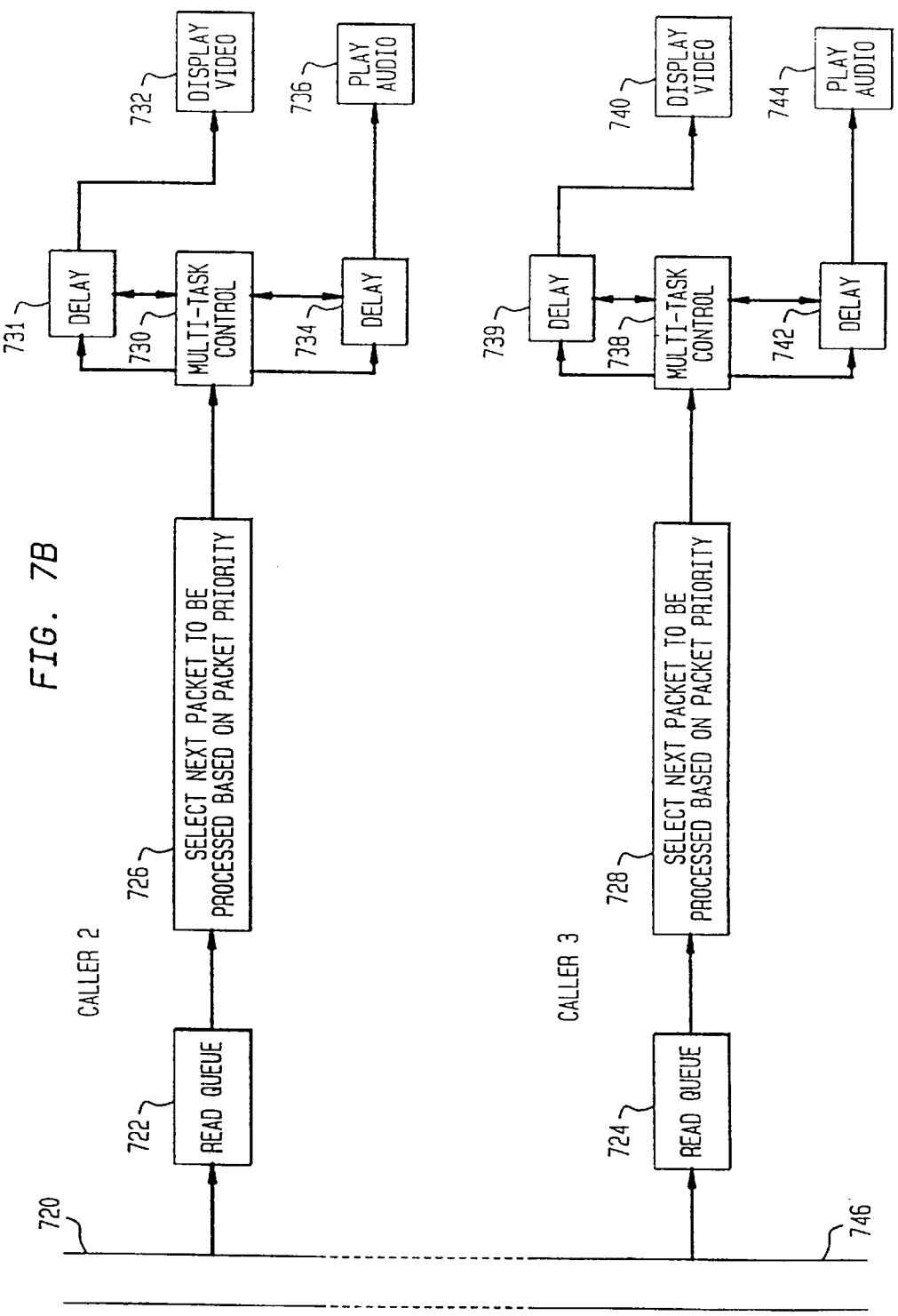
FIG. 7B is a block diagram of a multiple media communication system receiver in accordance with the present invention.

A block diagram of a multiple media communication system receiver is shown in FIG. 7B. Two substantially similar receivers, one for caller 2 and another for caller 3 are illustrated. Both callers are respectively connected to a broadcast communication channel 720, 746. A ReadQueue 722, 724 (a buffer memory for storing packets) receives packets for processing. A control means 726, 728 selects packets to be processed based on the packet priority. A multi-tasking control 730, 738 processes data packets in accordance with assigned priorities. As indicated, audio packets have the highest priority and are processed first. Other packets are processed in accordance with priority in a multi-tasking environment which balances speed of execution among the different priority packets while making sure to complete all tasks. A variety of multi-tasking control techniques for completing multiple tasks simultaneously, giving priority to higher tasks, while devoting some system resources to complete the lowest priority tasks, are known to those skilled in the art.

Audio data playback is delayed in a delay 734, 742, as indicated above. Video data display is similarly delayed in delay 731, 739 to maintain synchronism between video and audio. The multi-task control 730, 738 sets the amount of delay (for both video and audio) in accordance with the predicted average delay of the communication channel 720, 746. Delayed audio is then displayed 736, 744 at the receiver for caller 2 and caller 3. Delayed video is simultaneous displayed 732, 740 at the receiver for caller 2 and caller 3.

Furthermore, since callers 2 and 3 are both receiving the same packets broadcast by caller 1, both hear and view the same multimedia messages.

Multimedia communication is typically two way between all callers. It should be understood that caller 1, caller 2 and caller 3 all include the transmitter and receiver elements shown in FIGS. 7A and 7B. This does not mean, however, that all callers need to transmit or receive data. Each caller can choose to (or be required to) receive only or transmit only.

In operation, at caller 1 in FIG. 7A, successive multimedia data packets with assigned priority are generated 708, 710, 712 from respective multimedia sources 702, 704 and 706. As the packets are generated, each is placed 714 in priority order in a queue 716 and transmitted over a communication channel 718. If the channel capacity were unlimited, packets would be transmitted as soon as generated. However, in the normal case, generated packets may accumulate awaiting transmission because the communication channel capacity is limited. The present priority scheme assures that packets are transmitted in priority order with the highest priority packets transmitted first.

At the receiver, callers 2 and 3 in FIG. 7B both receive packets from the communication channel 720, 746. Received packets at callers 1 and 2, are processed in accordance with the received priority, to play back the received audio, video and display of the received text/graphics. Since both callers 2 and 3 receive the same packets, a three party videoconference call is created.

Continuity of audio playback is perceived as critical to a multimedia conference. Accordingly, audio packets, being assigned the highest priority, are sent as soon as possible, and at the receiver, are processed as soon as possible after receipt. Thus, audio packets tend to be delivered in the shortest time which the communication channel will allow.

The system of the present invention tolerates transmission errors inherent in a traditional packet switched system by discarding or retransmitting corrupted audio or video. For text files, the normal error detection and retransmission requests are used. Sound and video are distinguished from text or file data in that it is possible to tolerate some loss of sound and video and still maintain an acceptable quality. In the event of a detected error in the received audio or video packet, the receiver determines whether there is sufficient time to flag the error and request a retransmission, based on the predicted average delay time of the system. If there is not sufficient time, the corrupted packet is ignored. In such manner, network capacity is not wasted on retransmissions which will arrive too late and have to be discarded anyway. However, the lowest priority packets of text/graphics or computer file data which are not time dependent, are flagged for errors and retransmitted.

Object Oriented CPacketStream Streaming Method

Various types of streams are used to achieve multimedia communications. First, a connection stream provides the interface to the communication channel. Then, there is a media stream for each desired media. For example, there may be a video stream, an audio stream, a video and audio stream such as QuickTime, or a text/data/graphics stream representing files, graphic images of many types, or any other data required. The architecture is designed to support "drop in" streams for new kinds of collaborative data.

Figure 8:
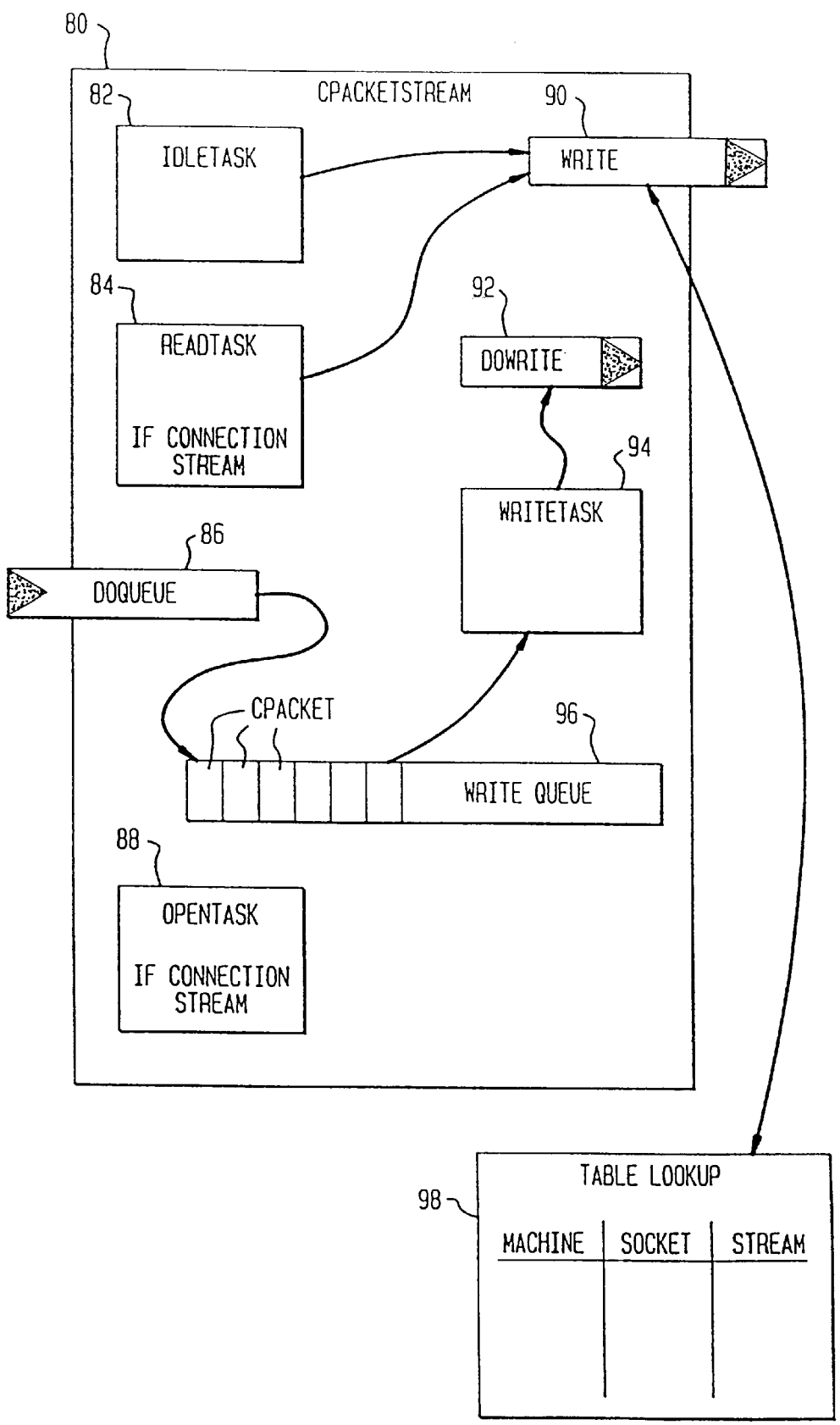
FIG. 8 is a block diagram of a method and apparatus for processing a data packet in accordance with the present invention.

The block diagram of FIG. 8 illustrates the method and apparatus for sending and receiving data packets, also termed CPackets. Each of the above methods and tasks is described in detail below, including pseudo code for realizing each of the methods and tasks on a general purpose digital computer. Although the preferred embodiment is described in terms of software operating in a Macintosh computer environment, it will be understood that the present multiple media communication system of the present invention may be implemented in hardware, such as in dedicated logic, microprogrammed bit slices, programmable arrays and the like.

CPacketStream 80 is a software component which is responsible for handling CPackets to establish communication channels between machines. Each CPacketStream 80 is composed of a set of routines (or methods) responsible to interact with CPackets. These methods are used in turn by a set of tasks running in each CPacketStream. The task types and methods (or routines) available for packet handling are summarized as follows and described in more detail below.

TASKS:
    WriteTask (prioritized multi-tasking of received CPackets)
    ReadTask (connection stream distributes received CPackets)
    IdleTask (send final packet and initial packet)
    OpenTask (open connection stream)

METHODS
    DoQueue (puts a Cpacket in the WriteQueue)
    DoWrite (generates actual output from packet data)
    DoIdle (idle between packets)
    Write (lookups destination and calls DoQueue)
    WriteDone (acknowledges receipt of packet)
    WriteQueue (A buffer containing CPackets in priority order)
    ReadQueue (A buffer containing CPackets in received order)
    CPacketStream::WriteTask 94

The WriteTask 94 is responsible for distributing packets contained in the WriteQueue 96 in each CPacketStream 80. The priority of this task is at least as high as the packet it is currently handling. This task is in a loop currently scanning the WriteQueue 96, if the queue is empty then the task will sleep. The CPacketStream::DoQueue method will put a CPacket into the WriteQueue 96, and wake the WriteTask 94 up. Therefore, the WriteTask 94 will be the one displaying or playing the packets.

CPacketStream::WriteTask
    if a packet in WriteQueue
        call DoWrite for that packet to handle data
    end
end
    CPacketStream::ReadTask 82

The ReadTask 84 is responsible for reading CPackets from a particular channel, and redistributing among CPacketStreams 80 in that machine. This type of task is only appropriate for a connection (media) CPacketStream 80. (In a way it is similar to the WriteTask 94, serving a WriteQueue 96, but in the reverse direction, and corresponding to receiving data packets in a ReadQueue)

CPacketStream::ReadTask
    if a new packet read
        write a new packet
    end
end
    CPacketStream::IdleTask 82

The idle task 82 is responsible for generating and sending 'helo' (the initial packet) and 'kiss' (the final packet) CPackets. It is also responsible to execute idle time events in some particular streams. For example, a Communications Tool (from Apple Computer) needs to have an idle call every so often in order to handle a particular connection.

CPacketStream::IdleTask
    if initial packet not sent
        if initial packet not created
            create initial packet
        end
        sent initial packet
    end
    idle stream if necessary
    if stream should die
        if final packet not created
            create final packet
        end
        send final packet
    end
    if final packet sent and stream should die
        disable and delete the streams
    end
end An OpenTask 88 is used when the connection is being first opened and the connection negotiated between callers. At that time, the contents of the table lookup 98, which defines media types and connection streams is determined. In addition to these tasks, there are several methods that are called by these tasks in order to communicate with the stream. These methods are:

CPacketStream DoQueue 86

This is the method that is called in order to give a packet to a particular stream. Most streams will immediately write the packet to a WriteQueue 96, and activate the WriteTask 94 in order to handle that particular packet.

CPacketStream::DoQueue 86
    put packet into the write queue
    wakeup WriteTask
end
    CPacketStream::DoWrite 92

The WriteTask 94 will call this routine to actually handle the packet's content. For a connection stream, this is the output routine of a CPacketStream 80 to the communication channel. For a video stream, this routine will decompress and display the video contained in a packet. For other media streams, the DoWrite 92 routine will carry out the appropriate process to get the data displayed, played or otherwise.

CPacketStream::DoWrite
    handle the packet's data
end
    CPacketStream::DoIdle This is the routine which can be used to idle the CPacketStream 80. Many streams can use this to do periodic tasks.

CPacketStream::DoIdle
    perform periodic task
end
    CPacketStream::Write 90

This routine will look up in table 98 the destination address for each destination in the packet, and the call DoQueue 86 for each destination packet stream. Each DoQueue 86 can refuse the packet until a later time, and therefore the packet contains flags for each destination address such that a complete write will mark that address completely written. A packet therefore contains an active destination count (72 in FIG. 6).

```
CpacketStream::Write
    for all destination addresses in packet
        lookup destination stream in address table
        if alias entry and 'info' packet
            add writeAsRemoteInfo flag
        end
        if found
            call DoQueue method for destination stream
            if successful
                mark destination address write complete
            end
        else
            mark destination address write deleted
        end
    end
end
```

Data packet flow and handling through CPacketStream 80 is from calls to DoQueue 86 which will write a CPacket into the WriteQueue 96, and then activate WriteTask 94, which processes the Cpackets, and calls DoWrite 92 to distribute the Cpackets contained in the WriteQueue 96.

CPacketStream::WriteDone

This routine will be called to dispose of the packet generated by a certain stream. It can be used for synchronization. A connection stream has the option of calling WriteDone to transfer acknowledge packets on the outgoing connection. The CPacketStream owns the packet which it sends, until all other streams are done with the packet. At that time, the packet ready to be deleted. However, when a packet (e.g., video) is sent from one machine on to another machine, such as between an ethernet LAN (local area network) and a telephone modem, the packet (e.g., the video) is not actually being used. In such circumstances, the originating connection stream should hold the packet, until all other connections have used this packet on the other machine(s). Synchronization of packet receipt is accomplished by returning an acknowledge packet when the WriteDone function of the connection stream is called at each machine which receives the packet. This is an additional form of communications between machines to reinforce the normal packet communications. "Acknowledge" packets have the same priority as the information packets, the lowest packet priority.

Streaming Algorithm

Figure 9:
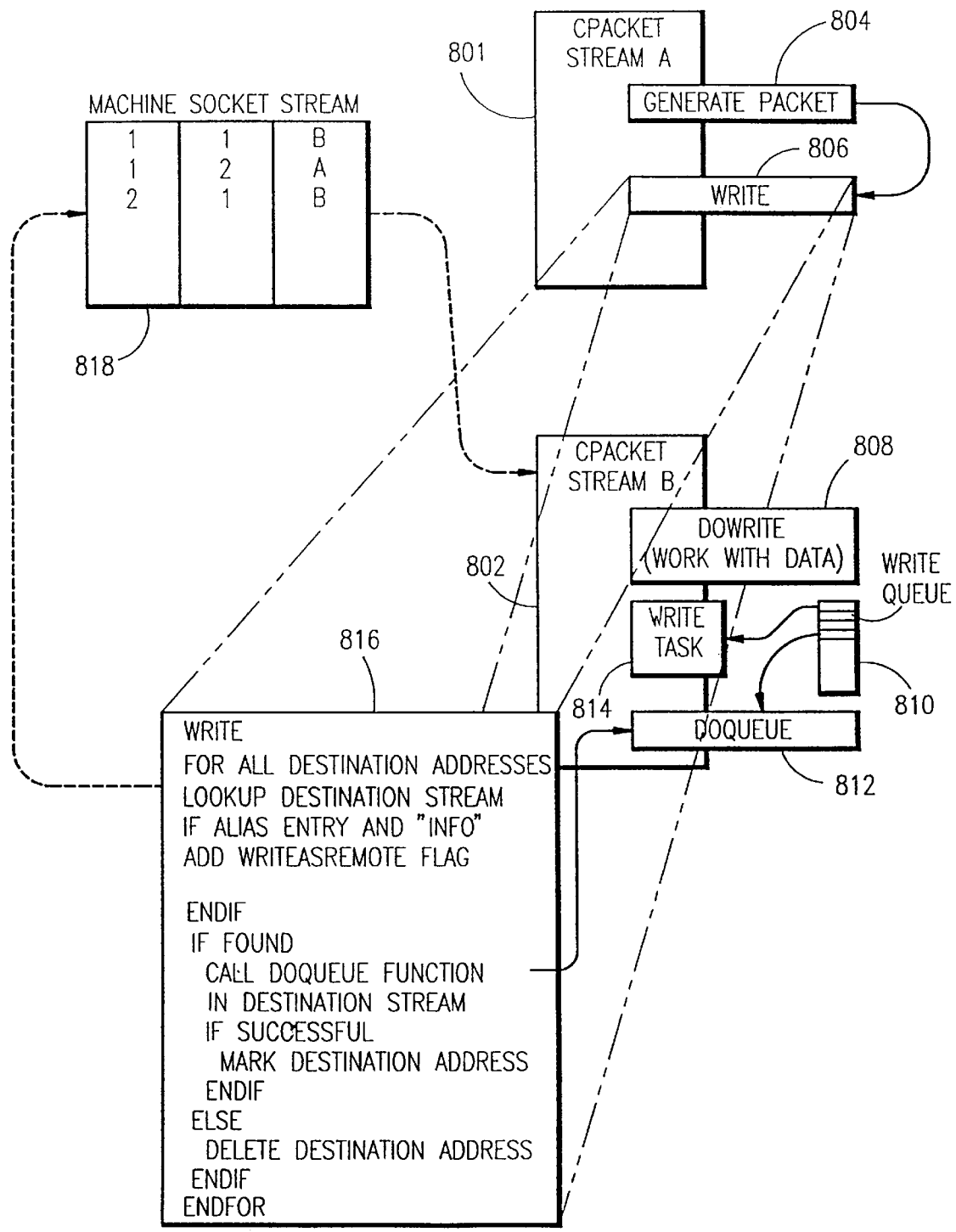
FIG. 9 is a block diagram illustrating the sequence of operation of a method and apparatus for processing data packets in accordance with the present invention.

A generalized representation of the use of the present streaming algorithm is shown in the block diagram of FIG. 9. Two CPacketStreams, CPacketStream A, 801 and CPacketStream B, 802 are shown. By way of example, if CPacketStream A was a connection stream, then CPacketStream B would be a media stream, such as a video stream. On the other hand if CPacketStream A was a video stream, such as from a frame grabber, then CPacketStream B would be a connection stream. In general, there is one stream for each type of media, plus one stream for each connection. That is, a separate connection stream is used for each caller. Thus, for a two way conference with one other caller, there is one connection stream, while for a three way conference there are two connection streams, one for each of the other two callers. In an alternate embodiment, such as may be used with future higher speed communication systems, a single connection stream may be used with more than one caller.

FIG. 9 also shows a lookup table 818 which is filled in when each stream is established for keeping track of the destination of the various packets. In operation, a packet is generated 804 and the Write function 806 is called. The pseudo code 816 for the Write function 806 contains a reference to a lookup to table 818, which returns an address to CPacketStream B, 802. CPacketStream B, 802 calls DoQueue 812, which writes the CPacket to WriteQueue 810. WriteTask 814 is activated to process the CPacket, which calls DoWrite 808 to generate the output routine of a CPacketStream 80 to the communication channel, or other appropriate media output.

Figure 10:
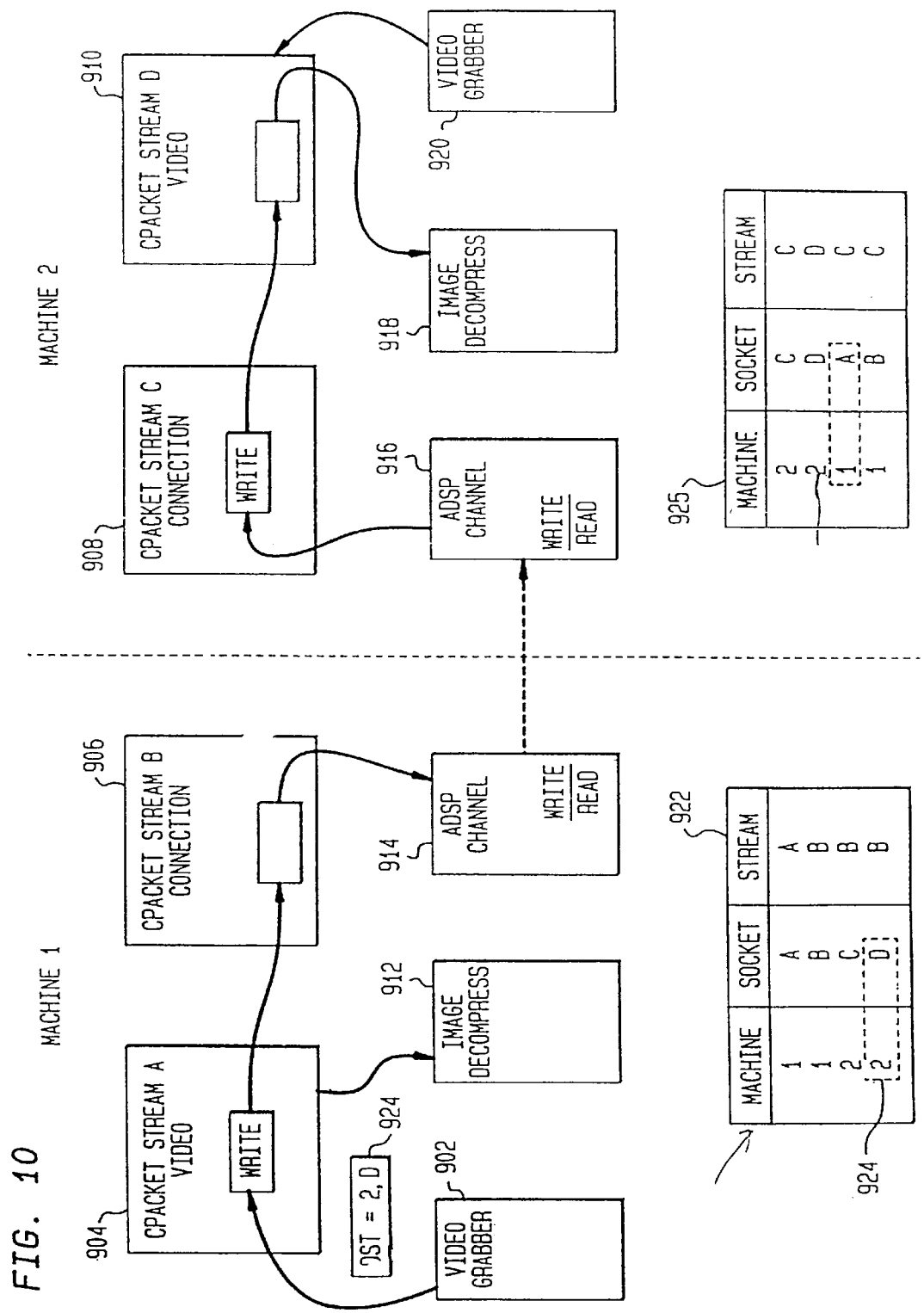
FIG. 10 is a block diagram of a method and apparatus for establishing a connection for specific media between callers used in conjunction with the present invention.

FIG. 10 illustrates the use of lookup tables to generate destination addresses from connection information between two given callers. By way of example, assume that CPacketStream A, 904 is a video stream connected to frame grabber 902 and image decompressor 912 at machine 1. A machine 2, CPacketStream D, 910 is also a video stream connected to a frame grabber 920 and image decompressor 918 at machine 2. Then, CPacketStream B, 906 is a connection stream coupled to a communication channel interface 914, such as for example a transmission source for an AppleTalk Data Streaming Protocol (ADSP) device. CPacketStream C, 908 is a connection stream coupled to a communication channel interface 916, shown as the receiving side of an AppleTalk Data Streaming Protocol device. Machine 1 uses table 922 to lookup the destination stream address 2,D for packets generated using data from video grabber 902. Similarly, machine 2 uses lookup table 925 to lookup the destination stream address 1,A for packets generated using data from video grabber 920.

Packet Acknowledgement

Figure 11:
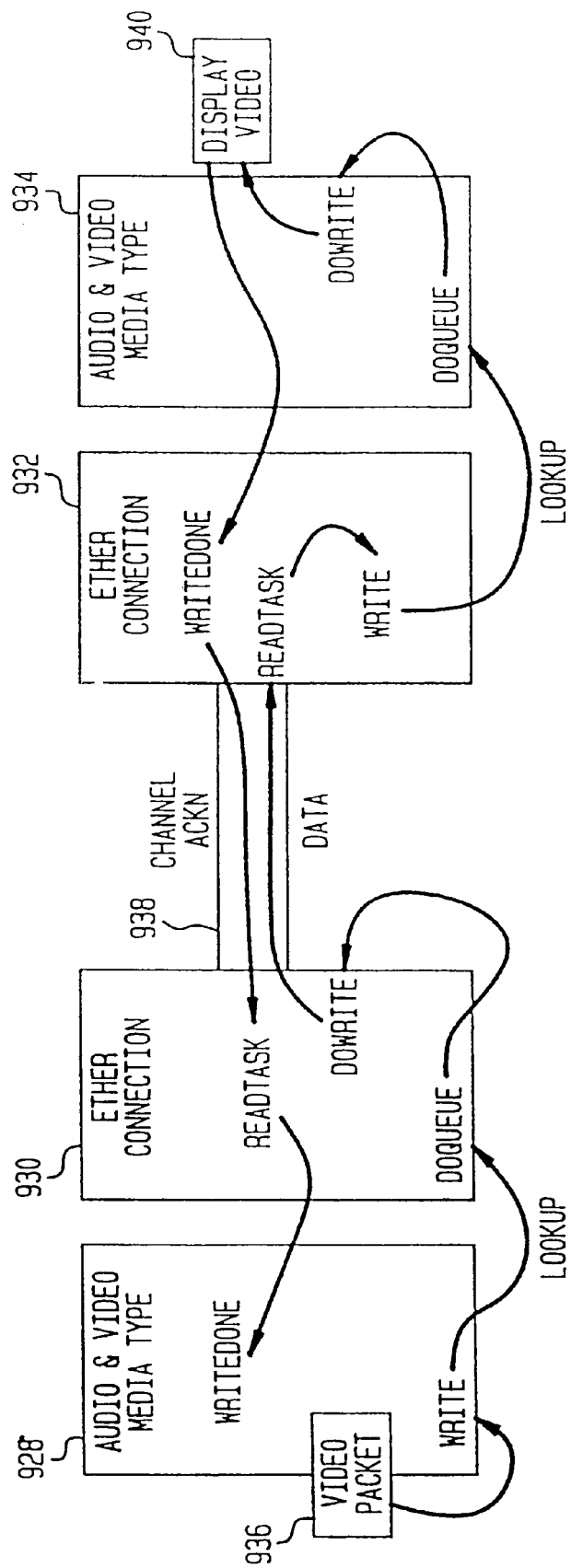
FIG. 11 is a block diagram illustrating the sequence of data packet flows with optional acknowledgement handshake packets.

A block diagram illustrating the use of an optional acknowledgement packet is shown in FIG. 11. A media stream 928, responsive to a video packet 936, calls the Write function, which through the appropriate lookup table, calls the DoQueue and DoWrite functions of connection stream 930, an ethernet connection stream. The video packet is transmitted on the ethernet communication channel 938 and received by the ReadTask and Write functions of connection stream 932. Thereafter, the DoQueue and DoWrite functions of media stream 934 are called through the appropriate lookup table which displays the data on video display 940.

The communication channel LAN protocol typically supports lower level acknowledgment functions. For example, it is known by the transmitting caller that the packet was received over the clear communication channel 938. Otherwise, the LAN protocol (at the ADSP level for example) would have returned an error indication. In addition to the acknowledge at the LAN protocol level, an acknowledge packet is generated when the received data is played (i.e., when the video data is displayed) in order to provide end to end synchronization information. The WriteDone function of connection stream 932 generates such acknowledge packet for return transmission across communication channel 938. Back at the originating transmitting caller, the ReadTask function of connection stream 930, calls WriteDone routine of media stream 928 to process the acknowledge packet. The receipt of an acknowledge packet also provides an indication of system delay for the media type of media stream 928, in this example, a video packet. The acknowledge packet contains a recorded time indicating when the video packet was actually used. Comparison of the recorded transmission time with the received recorded display time, provides a measure of the end to end system delay.

Prioritized Data Packet Processing

Figure 12:
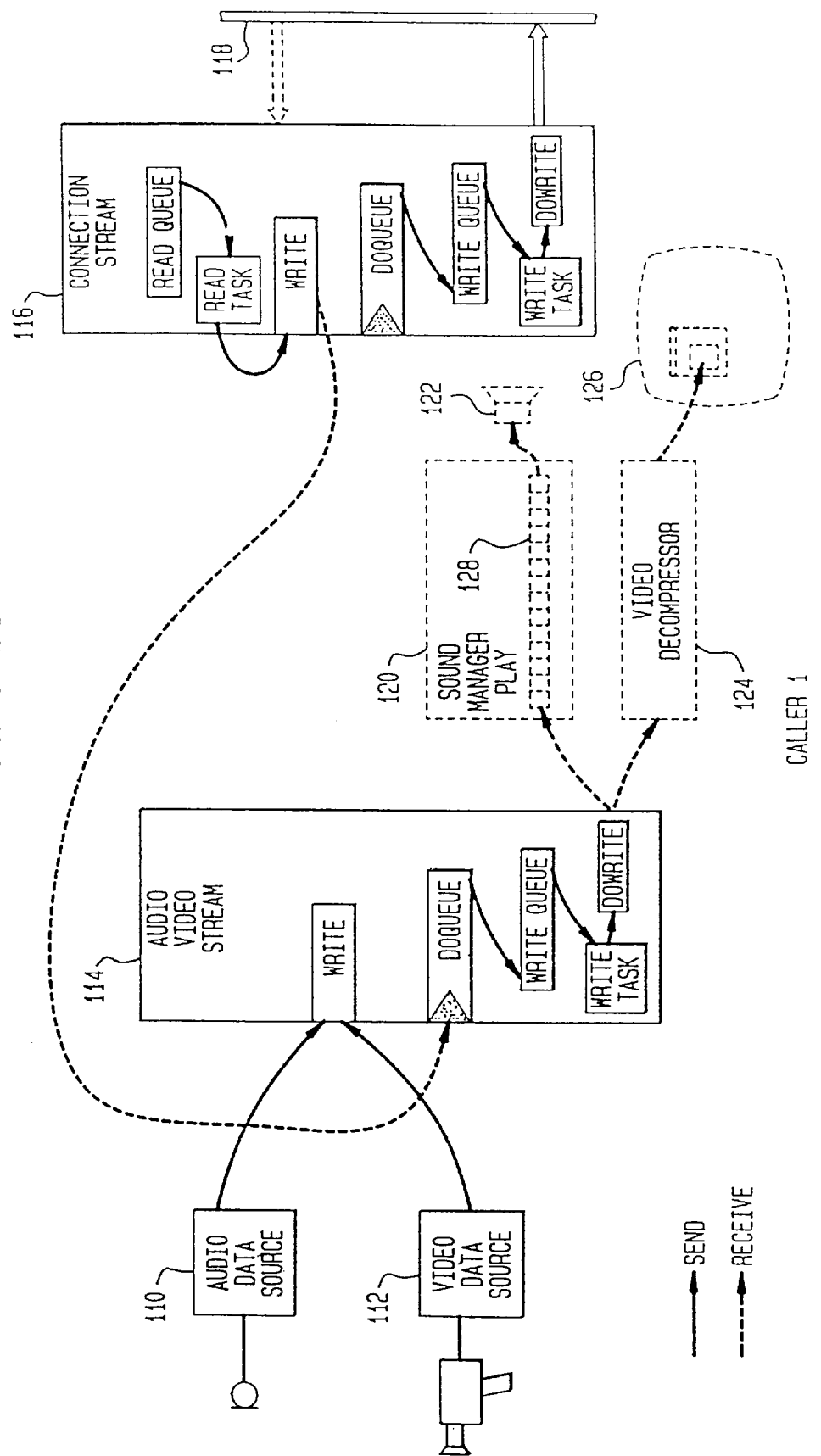
FIG. 12 is a block diagram of a multiple media digital communications system for sending and receiving multiple media for a first caller in accordance with the present invention.
Figure 13:
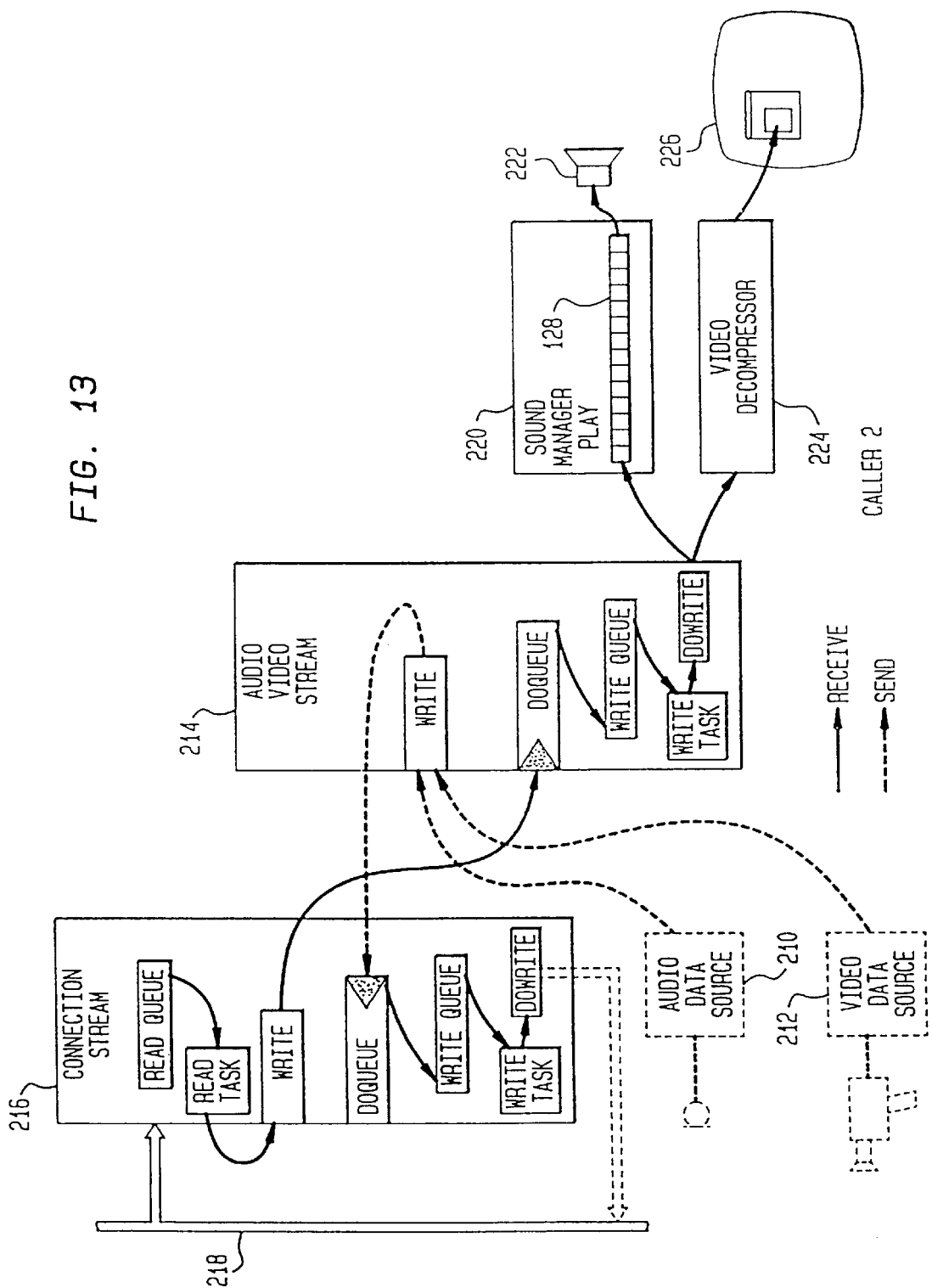
FIG. 13 is a block diagram of a multiple media digital communications system for receiving and sending multiple media for a second caller in accordance with the present invention.

A system block diagram is illustrated in FIGS. 12 and 13. FIG. 12 shows the transmission elements in solid lines and the receive elements in dotted lines. FIG. 13 shows the receive elements in solid lines and the transmit elements in doted lines.

In FIG. 12, and audio data source 110 and video data source 112 are coupled through audio/video stream 114 and connection stream 116 to data communication channel 118. In FIG. 13, data communication channel 118 is coupled to connection stream 216, and then to audio/video stream 214. Audio is played by sound manager 220, which includes a FIFO delay buffer 228. Video is played back by video decompressor 224 coupled to video display device 226.

For the return direction, FIG. 13 also shows audio data source 210 and video data source 212, coupled to the communication channel 218 through audio/video stream 214 and connection stream 216. At the transmission side in FIG. 12, audio is played by sound manager 120, which includes a FIFO delay buffer 128. Video is played back by video decompressor 124 coupled to video display device 126.

In operation in FIG. 12, data generated by audio source 110 and video data source 112 are placed into packets in audio/video stream 114, and forwarded to connection stream 116. The connection stream arranges the available packets in priority order before transmission on the network communication channel 118. Once transmission of a packet has begun, however, it is typically not interruptable. For example, if a video packet represents a video frame update, and the video packet transmission has started, no audio packet can be sent until the current packet is completed. If it is desired to improve audio transfer, the video frame update may be divided into smaller sub-frame packets. Then, an audio packet will be inserted during transmission of a complete video frame update, i.e., by insertion between sub-frame packets forming the video frame update.

In FIG. 13, data packets received by connection stream 216 are distributed to the audio/video stream 214. Audio data packets, having a higher priority represent a higher priority task. Thus, the sound manager 222 is given priority over the video decompressor 224. As indicated above, delay buffer 228 is set equal to the predicted average packet transmission delay of the communication system. Alternatively, the delay provided by delay buffer 228 is dynamically adjustable according to system delay as measured by time reported by return message packets or acknowledge packets. Audio playback is slowed or accelerated in order to shrink or grow the difference in time between the sender and receiver.

Additional media types, such as file text or screen documents may be added to the block diagrams of FIGS. 12 and 13 as additional inputs to the Write function of stream 114 in FIG. 12 and additional outputs of stream 214 in FIG. 13. In sharing collaborative documents, one member of the conference may be running the application such as a word processor or spreadsheet, and the others viewing a screen only. Alternatively, one member of the conference may be running the application, but the keystrokes of the others are transmitted back to the one member as text data. In such manner, conference members may each have direct input into the collaborative application.

As indicated, the preferred embodiment of the present invention is in software running on a Macintosh computer. A software embodiment has the advantage of being hardware independent, capable of working with any available media source, and across any available communication system. In addition, CPacketStream tasks and methods are shared by various connection streams and media streams. It is noteworthy that the present system achieves multimedia conferencing in a uniprocessor architecture.

Alternative embodiments of the present multimedia communication system include multi-processor architectures where the multi-tasking of received multimedia data packets may be replaced by parallel processing, or in special purpose hardware. In dedicated hardware, each CPacketStream could be a special purpose microprogrammed integrated circuit, where one chip would be required for each media type, and for each connection.

Figure 14:
FIG. 14 is a first configuration of the present invention for conducting a standard videoconference call over an ethernet network.
Figure 15:
FIG. 15 is an alternate configuration of the present invention for conducting a standard videoconference call with collaborative data over an ethernet network.

FIGS. 14 through 18 illustrate the various capabilities of the present system of multiple media digital communication. FIG. 14 illustrates a standard video call of the type shown in FIG. 2 over an ethernet network of the type illustrated. FIG. 15 illustrates a video call with collaborative data over an ethernet network of the type illustrated on the screen in FIG. 3. This configuration is contemplated as the most common type of multimedia call.

Figure 16:
FIG. 16 is an alternate configuration of the present invention for leaving a recorded multimedia message of a videoconference call with collaborative data over an ethernet network.
Figure 17:
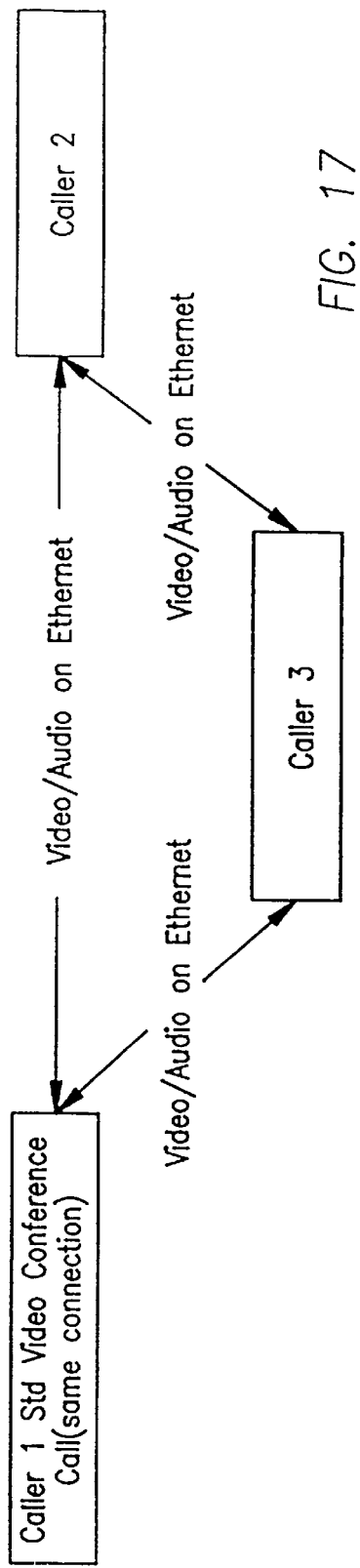
FIG. 17 is a three caller multimedia conference call in a system in accordance with the present invention.
Figure 18:
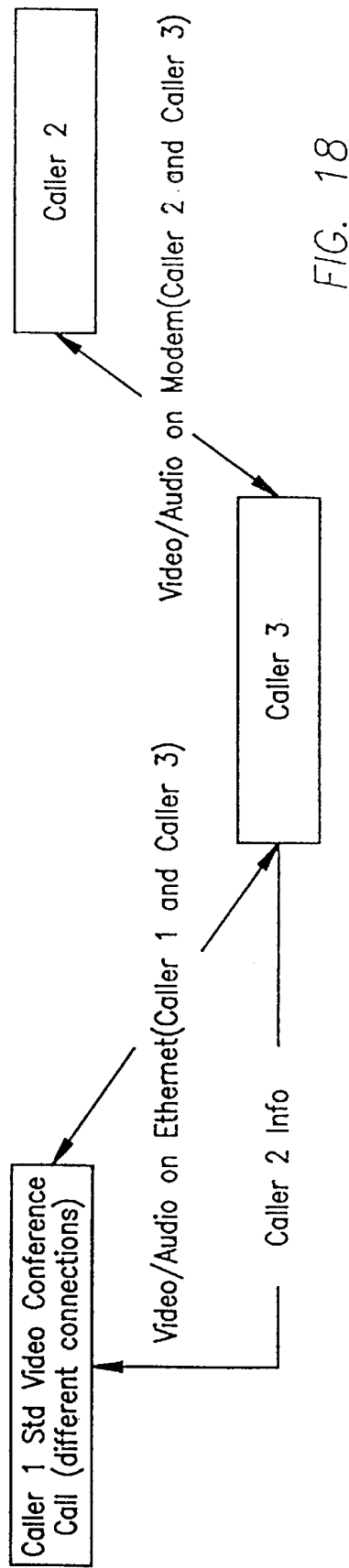
FIG. 18 is an alternate embodiment of a three caller multimedia conference call in a system using both ethernet and a telephone modem in accordance with the present invention.

FIG. 16 illustrates a one way video/audio call with collaborative data over an ethernet network. The data is one way because first party did not answer, but that party was configured to accept messages. The received data is recorded in memory or on disk and played back later, thus creating a multimedia message answering machine. In the message record mode, system delays are not limiting because the message does not have to be recorded in real time; the only requirement is to play it back in real time. The message is recorded on one machine, and sent as a complete message file to the other machine, and there stored on the drive.

A three way videoconference call is illustrated in FIG. 3. Caller 1, caller 2 and caller 3 are connected over an ethernet communication system. Each caller broadcasts multimedia digital packets to the other two callers. The connection may be expanded to more than three callers. Each caller will see a video image of all the other conferences on their screen in separate windows, as well as hear the conversation and view collaborative data.

An alternate embodiment for a three way videoconference call is illustrated in FIG. . Two callers (1 and 3) are on ethernet. Another caller, 2 is connected by modem. Caller 3 links caller 1 to caller 2. To link callers 1 and 2, caller 3 rebroadcasts received data packets from caller 1 over ethernet, to caller 3 over modem, and vice versa.

What is claimed is:

1. A method of communicating media data packets from a first processing machine to at least one remote processing machine over a communication system, said method comprising the steps of:

enabling at said first processing machine a connection processing stream for said remote processing machine with which said first processing machine communicates over said system during a connection;

enabling at said first processing machine at least one media processing stream associated with said connection processing stream;

establishing a relationship in said first processing machine which associates a media processing stream located in said remote processing machine with said connection processing stream in said first processing machine;

processing with said media processing stream in said first processing machine at least one type of media data to produce media data packets;

determining a communication path for sending said media data packets to said media processing stream located at said one remote processing machine and through said connection stream at said first processing machine based on said established relationship;

transmitting said media data packets to said media processing stream in said remote processing machine through said communication path;

recording in said first processing machine a time of transmission for at least one of said media data packets;

receiving an acknowledgment message from said remote processing machine containing information representing when said at least one media data packet sent from said first processing machine was processed at said remote processing machine; and determining at said first processing machine an end to end system delay based on said recorded time of transmission of said at least one data media packet and said information in said acknowledgment message.

2. A method as in claim 1, wherein said media data is audio data and said media data packets are audio data packets.

3. A method in accordance with claim 1, wherein plural types of media data packets are transmitted by said first processing machine, including audio data packets and video data packets, said method further comprising;

providing an association between a source of audio data and a source of video data and respective audio and video media processing streams which respectively provide audio and video data packets; and transmitting each of said audio and video data packets through said connection processing stream associated with said audio and video media processing streams to audio and video data packet processing streams in said remote processing machine in accordance with a relationship established in said first processing machine which associates the audio or video data packet processing stream in said remote machine with said connection processing stream.

4. A method in accordance with claim 3, wherein said plural types of media data packets further includes text/graphics data packets, said method further comprising:

providing an association between a source of text/graphics data and a respective text/graphics media processing stream which provides text/graphics data packets; and transmitting said text/graphics data packets through said associated connection processing stream in said first processing machine to a text/graphics media processing stream in said remote processing machine in accordance with a relationship established in said first processing machine which associates the audio and video data packet processing streams in said remote machine with said connection processing stream.

5. A method in accordance with claim 1, wherein said first processing machine receives media data packets from said remote processing machine, said method further comprising:

receiving at said connection processing stream in said first processing machine media data packets directed thereto from a said remote processing machine; and directing received media data packets from said connection processing stream to a receiving media data processing stream for processing the same.

6. A method as in claim 5 further comprising the step of:

delaying received media packets, said delay being set in accordance with an end to end system delay.

7. A method as in claim 6, wherein said step of setting said delay further comprises:

increasing and decreasing said delay to be substantially equal to said determined end to end system delay; and, wherein the delay of said received media packets increases and decreases substantially in accordance with said end to end system delay.

8. A method as in claim 7, wherein said received media data packets are audio data packets.

9. A method as in claim 7, wherein said received media data packets are video data packets.

10. A method as in claim 7, wherein said received media data packets are text/graphics data packets.

11. A method of communicating media data packets from a first processing machine to at least one remote processing machine over a communication system, said method comprising the steps of:

enabling at said first processing machine a connection processing stream for said remote processing machine with which said first processing machine communicates over said system during a connection;

enabling at said first processing machine at least one media processing stream associated with said connection processing stream;

establishing a relationship in said first processing machine which associates a media processing stream located in said remote processing machine with said connection processing stream in said first processing machine;

processing with said media processing stream in said first processing machine at least one type of media data to produce media data packets;

determining a communication path for sending said media data packets to said media processing stream located at said remote processing machine and through a connection stream at said first process machine based on said established relationship;

transmitting said media data packets to said media processing stream in said remote processing machine through said communication path;

receiving at said connection processing stream in said first processing machine a media data packet directed thereto from said remote processing machine;

directing said received media data packet from said receiving connection processing stream to a receiving media data processing stream for processing the same;

determining if the received media data packet is an audio or video data packet; and if so, then:
  detecting errors in said received audio or video data packet; and
  if an error is detected, determining if there is sufficient time for a retransmission of a receiving audio or video data packet based on a delay time in the transmission path for said received audio or video data packet.

12. The method of claim 11 further comprising the steps of:

requesting a retransmission of a received audio or video data packet containing errors if there is sufficient time for a retransmission.

13. The method of claims 11 or 12 further comprising the steps of:

ignoring a received audio or video data packet if it contains errors.

14. A method as in claim 13, wherein said established relationship is provided in said first processing machine as an address table which associates said media processing stream located at said remote processing machine with a respective connection processing stream in said first processing machine.

15. A recorded medium containing a program for operating a first processing machine to enable a method of communicating media data packets from said first processing machine to at least one remote processing machine over a communication system, said method comprising the steps of:

enabling at said first processing machine a respective connection processing stream for each remote processing machine with which said first processing machine communicates over said system during a connection;

enabling at said first processing machine at least one media processing stream associated with each said connection processing stream;

establishing an address table in said first processing machine which associates a media processing stream located in said at least one remote processing machine with a respective connection processing stream in said first processing machine;

processing with said media processing stream in said first processing machine at least one type of media data to produce media data packets;

consulting said address table to determine a communication path for sending said media data packets to a media processing stream located at said remote processing machine; and transmitting said media data packets to said media processing machine through a said connection stream associated with said media processing stream in said first processing machine and with an address of said media processing stream at said remote processing machine.

16. A recorded medium as defined in claim 15, wherein said method further comprises the steps of:

receiving at a receiving connection processing stream in said first processing machine media data packets directed thereto from a said remote processing machine; and directing received media data packets from said receiving connection processing stream to a receiving media data processing stream for processing the same.

17. A recorded medium as defined in claim 15, wherein plural types of media data packets are transmitted by said first processing machine, including audio data packets and video data packets, and said method further comprising:

providing as association between a source of audio data and a source of video data and respective audio and video media processing streams which respectively provide audio and video data packets; and transmitting each of said audio and video data packets through a said connection processing stream associated with said audio and video media processing streams in said first processing machine to audio and video data packet processing streams in said remote processing machine in accordance with address information contained in said table.

18. A recorded medium as defined in claim 17, wherein said plural types of media data packets further include text/graphics data packets, and said method further comprises the steps of:

providing an association between a source of text/graphics data and a respective text/graphics media processing stream which provides text/graphics data packets; and transmitting said text/graphics data packets through said connection processing stream in said first processing machine to a text/graphics media processing stream in said remote processing machine.

19. A recorded medium as defined in claim 17, wherein said audio data packets and video data packets have respective associated priorities, said associated connection processing stream in said first processing machine transmitting said audio data packets and video data packets originating at said first processing machine to said remote processing machine in accordance with said associated priorities, wherein said audio data packets have a higher priority than said video data packets.

20. A recorded medium as defined in claim 18, wherein said audio data packets, video data packets and graphics and/or text data packets have respective associated priorities, said connection processing stream in said first processing machine transmitting said audio data packets and video data packets and graphics/text data packets originating at said first processing machine to said communication system in accordance with said associated priorities, said audio data packets having a higher priority than said video data packets and said video data packets having a higher priority than said text/graphics data packets.

21. A recorded medium as defined in claim 15, wherein each of said media data packets contains one or more addresses therein identifying a recipient for said packets.

22. A recorded medium as defined in claim 16, wherein each of said media data packets contain a plurality of addresses therein identifying respective recipients for said packets.

23. A recorded medium as defined in claim 16, wherein said method further comprises the steps of:

checking in said first processing machine for errors sufficient to corrupt received media data packets, and requesting a retransmission of said received media data packets provided there is sufficient time for receipt of a retransmission based on the average system delay for a retransmission.

24. A recorded medium as defined in claim 15 wherein each of said media data packets includes a destination count area containing a count of the number of destinations each packet should reach, and a data area representing how many of those destinations have not yet been reached.

25. A recorded medium as defined in claim 15 said method further comprising the step of:

placing information in said address table at least during the establishment of a connection between said first processing machine and said at least one remote processing machine.

26. A recorded medium as defined in claim 16 said method further comprising the step of:

checking in said first processing machine for errors sufficient to corrupt received media data packets and for discarding corrupt received media data packets.

27. A recorded medium as defined in claim 16, wherein said first received media data packets contain audio data and, said method further comprises the step of delaying an audio signal recovered from said received media data packets by a given delay to form a delayed recovered audio signal.

28. A recorded medium as defined in claim 27, wherein said step of delaying said recovered audio signal to form a delayed recovered audio signal, further comprises the step of:

setting said given delay substantially equal to the delay of said communication system.

29. A recorded medium as defined in claim 28, wherein said step of setting said given delay substantially equal to the delay of said communication system further comprises:
  measuring the delay of said communication system;
  increasing said given delay to be substantially equal to said measured delay; and
  decreasing said given delay to be substantially equal to said measured delay,
  wherein the delay of said delayed recovered audio signal increases and decreases substantially in accordance with said measured delay of said communication system.

30. A recorded medium containing a program for performing the method defined in claim 16, wherein said received media data packets contain video data, said method further comprising the step of delaying a video signal recovered from said media data packets by a given delay to form a delayed recovered video signal.

31. A recorded medium as defined in claim 30, wherein said step of delaying said recovered video signal to form a delayed recovered video signal, further comprises:
  setting said given delay substantially equal to the delay of said communication system.

32. A recorded medium as defined in claim 31, wherein said step of setting said given delay substantially equal to the delay of said communication system, further comprises:
  measuring the delay of said communication system;
  increasing said given delay to be substantially equal to said measured delay; and
  decreasing said given delay to be substantially equal to said measured delay,
  wherein the delay of said delayed recovered video signal increases and decreases substantially in accordance with said measured delay of said communication system.

33. A recorded medium as defined in claim 15, wherein said at least one media processing stream processes video information to produce video data packets which are provided to said connection processing stream.

34. A recorded medium as defined in claim 33, wherein said at least one media processing stream processes video frame information as sub-frames to produce video data packets which are provided to said connection processing stream.

35. A recorded medium as defined in claim 16, wherein connection processing streams of said first processing machine process transmitted and received media data packets in accordance with priority information contained therein.

36. A recorded medium as defined in claim 35, wherein said received media data packets include received audio data packets which have a higher assigned priority than other received media data packets, and wherein said first processing machine processes received audio data packets before processing other types of received media data packets.

37. A recorded medium as defined in claim 16, wherein said first processing machine includes at least one media processing stream for processing received audio data packets, and at least one media processing stream for processing received video data packets associated with the audio data packets, each of said video processing stream and audio processing stream providing respective delays in the reproduction of video and audio data which are substantially equal to ensure synchronization of the received audio and video data.

38. A recorded medium as defined in claim 37, wherein the delay provided by said video processing stream and audio processing stream is set as the maximum delay through the communication system which is encountered by received video data packets and received audio data packets.

39. A recorded medium as defined in claim 15, wherein said at least one media processing stream processes audio information to create audio data packets which are provided to a said connection stream.

40. A recorded medium as defined in claim 39, wherein said connection processing stream also process other media data packets, and said audio data packets and other media data packets have respective associated priorities, said connection processing stream transmitting said audio data packets and other media data packets originating as said first processing machine to said communications system in accordance with said associated priorities, said audio data packets having a higher priority than said other media data packets.

41. A recorded medium as defined in claim 17, wherein said audio data packets and video data packets have respective associated priorities, said connection processing stream in said first processing machine transmitting said audio data packets and video data packets originating at said first processing machine to said communications system in accordance with said associated priorities, said audio data packets having a higher priority than said video data packets.

42. A recorded medium containing a program for operating a first processing machine to enable a method of communicating media data packets from said first processing machine to at least one remote processing machine over a communication system, said method comprising the steps of:
  enabling at said first processing machine a connection processing stream for said remote processing machine with which said first processing machine communicates over said system during a connection;
  enabling at said first processing machine at least one media processing stream associated with said connection processing stream;
  establishing a relationship in said first processing machine which associates a media processing stream located in said remote processing machine with said connection processing stream in said first processing machine;
  processing with said media processing stream in said first processing machine at least one type of media data to produce media data packets;
  determining a communication path for sending said media data packets to said media processing stream located at said remote processing machine and through a connection stream at said first process machine based on said established relationship;
  transmitting said media data packets to said media processing stream in said remote processing machine through said communication path;
  receiving at said connection processing stream in said first processing machine a media data packet directed thereto from said remote processing machine;
  directing said received media data packet from said receiving connection processing stream to a receiving media data processing stream for processing the same;
  determining if the received media data packet is an audio or video data packet; and if so, then:
    detecting errors in said received audio or video packet; and
    if an error is detected, determining if there is sufficient time for a retransmission of a received audio or video data packet based on a delay time in the transmission path said received audio or video data packet.

43. A recorded medium as defined in claim 42, said method further comprising the steps of:

requesting a retransmission of a received audio or video data packet containing errors if there is sufficient time for a retransmission.

44. A recorded medium as defined in claim 42 or 43, said method further comprising the steps of:

ignoring a received audio or video data packet if it contains errors.

* * * * *